(12) United States Patent
Peuchert et al.

(10) Patent No.: US 6,417,124 B1
(45) Date of Patent: Jul. 9, 2002

(54) ALKALI-FREE ALUMINOBOROSILICATE GLASS, AND USES THEREOF

(75) Inventors: Ulrich Peuchert, Mainz; Thomas Pfeiffer, Ingelheim; Peter Brix, Mainz; Hildegard Roemer, Karben, all of (DE)

(73) Assignee: Schott Glas (DE)

( * ) Notice: Subject to any disclaimer, the term of this patent is extended or adjusted under 35 U.S.C. 154(b) by 99 days.

(21) Appl. No.: 09/642,561

(22) Filed: Aug. 21, 2000

(30) Foreign Application Priority Data

Aug. 21, 1999 (DE) .......................... 199 39 789

(51) Int. Cl.$^7$ .......................... C03C 3/091; C03C 3/093
(52) U.S. Cl. .......................... 501/66; 501/56; 501/64; 501/67; 501/69; 501/70; 313/493; 313/636
(58) Field of Search .......................... 501/56, 64, 66, 501/67, 69, 70, 72; 313/493, 636

(56) References Cited

U.S. PATENT DOCUMENTS

| | | | | |
|---|---|---|---|---|
| 3,906,147 A | * | 9/1975 | Pirooz .......................... | 501/14 |
| 4,390,636 A | * | 6/1983 | Votava et al. .................. | 501/24 |
| 4,764,486 A | * | 8/1988 | Ishihara et al. ................ | 501/9 |
| 5,374,595 A | | 12/1994 | Dumbaugh, Jr. et al. ..... | 501/66 |
| 5,508,237 A | | 4/1996 | Moffatt et al. ................ | 501/69 |
| 6,124,224 A | * | 9/2000 | Sridharan et al. ............. | 501/15 |
| 6,309,990 B2 | * | 10/2001 | Tamura et al. ................ | 501/35 |

FOREIGN PATENT DOCUMENTS

| | | |
|---|---|---|
| DE | 196 01 922 A1 | 7/1997 |
| DE | 196 03 698 C1 | 8/1997 |
| DE | 196 17 344 C1 | 8/1997 |
| DE | 197 39 912 C1 | 12/1998 |
| EP | 0509792 A2 | 10/1992 |
| EP | 0 341 313 B1 | 6/1993 |
| EP | 0 672 629 A2 | 9/1995 |
| EP | 0 714 862 A1 | 6/1996 |
| JP | 8 295530 | 11/1996 |
| JP | 9 48632 | 2/1997 |
| JP | 9 156953 | 6/1997 |
| JP | 10 59741 | 3/1998 |
| JP | 10 72237 | 3/1998 |
| JP | 10 114538 | 5/1998 |
| JP | 10 130034 | 5/1998 |
| JP | 10 139467 | 5/1998 |
| WO | WO 97/11919 | 4/1997 |
| WO | WO 97/11920 | 4/1997 |
| WO | WO 98/27019 | 6/1998 |

OTHER PUBLICATIONS

Glass substrates for AMLCD applications: properties and implications, J.C. Lapp, SPIE vol. 3014, pp. 161–168. 1977.
Effect Of Small Amounts Of Sodium Molybdate On The Optical Characteristics Of Household Glass, I.A. BULycheva et al., Glass and Ceramics, vol. 55, Nos. 1–2, 1998, pp. 42–43.
Patent Abstract of Japan—09156953 A—Jun. 17, 1997.
Patent Abstract of Japan—10059741 A—Mar. 3, 1998.
Patent Abstract of Japan—10072237 A—Mar. 17, 1998.
Patent Abstract of Japan—10114538 A—May 6, 1998.
Patent Abstract of Japan –10130034 A—May 19, 1998.
Patent Abstract of Japan—10139467 A—May 6, 1998.
Patent Abstract of Japan—Publication No. 09048632—Shinkichi, Publication Date Feb. 18, 1997.

* cited by examiner

*Primary Examiner*—David Sample
(74) *Attorney, Agent, or Firm*—Millen, White, Zelano & Branigan, P.C.

(57) ABSTRACT

The invention relates a alkali-free aluminoborosilicate glasses having the following composition (in % by weight, based on oxide): $SiO_2$ 50–70, $B_2O_3$ 0.5–15, $Al_2O_3$ 10–25, MgO 0–10, CaO 0–12, SrO 0–12, BaO 0–15, with MgO+CaO+SrO+BaO 8–26, ZnO 0–10, $ZrO_2$ 0–5, $TiO_2$ 0–5, $SnO_2$ 0–2, $MoO_3$ 0.05–2. The glasses are particularly suitable as substract glasses for display and photovoltaic applications.

17 Claims, No Drawings

ALKALI-FREE ALUMINOBOROSILICATE GLASS, AND USES THEREOF

The invention relates to alkali-free aluminoborosilicate glasses. The invention also relates to uses of these glasses.

High requirements are made of glasses for applications as substrates in flat-panel liquid-crystal display technology, for example in TN (twisted nematic)/STN (supertwisted nematic) displays, active matrix liquid crystal displays (AMLCDs), thin film transistors (TFTs) or plasma addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to save weight, a relatively low density $\rho$, preferably $\leq 2.600$ mg/cm$^3$. Use as substrate material for integrated semiconductor circuits, for example TFT displays ("chip on glass") in addition requires thermal matching to the thin-film material a-Si or polysilicon ($\alpha_{20/300} \approx 3.7 \cdot 10^{-6}$/K) and the absence of alkali metal ions. Sodium oxide contents of less than 1000 ppm as a result of production can be tolerated with respect to the generally "poisoning" action due to diffusion of Na$^+$ into the semiconductor layer.

Suitable glasses should be capable of being produced economically on a large scale in adequate quality, for example in a float plant or by the drawing method. In particular, the production of thin (<1 mm) streak-free substrates with low surface undulation by the drawing process requires high devitrification stability of the glasses. Compaction of the substrate during production, which has a disadvantageous effect on the semiconductor microstructure, can be countered by establishing a suitable temperature-dependent viscosity characteristic line of the glass: with respect to thermal process and shape stability, it should have a sufficiently high glass transition temperature $T_g$, i.e. a glass transition temperature $T_g$ of at least 650° C., while on the other hand not having excessively high melting and working ($V_A$) points, i.e. a $V_A$ of $\leq 1330°$ C.

The demands made of glass substrates for LCD display technology are also described in "Glass substrates for AMLCD applications: properties and implications" by J. C. Lapp, SPIE Proceedings, Vol. 3014, invited paper (1997).

Corresponding requirements in principle are made of glasses for substrates in thin-film photovoltaics, especially based on microcrystalline silicon ($\mu$c-Si).

An essential prerequisite for the commercial success of thin-film photovoltaics over high-cost solar technology based on crystalline Si wafers is the presence of inexpensive high-temperature-resistant substrates.

At present, two different coating processes are known for the production of thin-film solar cells based on crystalline Si. A process which has proven particularly favourable with respect to high layer quality and thus efficiency and high deposition rates is a high-temperature CVD process using inexpensive trichlorosilane as Si source. This process proposes the direct deposition of thin crystalline Si layers and requires the heating of a suitable substrate to 1000° C. or above. The only suitable substrates are then comparatively expensive ceramics, graphite, silicon or similar materials. The use of glass-ceramics, which are likewise expensive, is also being discussed.

As an alternative to this, low-temperature Si deposition processes are being developed which allow the use of the less expensive substrate material glass. One possibility here is the deposition of amorphous silicon at low temperatures of up to 300° C. and, in a subsequent step, the recrystallization of the layers, for example using laser or zone-melting methods, with formation of partly crystalline $\mu$c-Si layers. In order to prevent deformation of the glass plate at the temperatures prevailing in the heating process, a special glass with very high heat resistance which is matched thermally to silicon is necessary, as is the case in glasses having glass transition temperatures $T_g$ of at least 650° C. As a consequence of the tendency to change over from a-Si to crystalline poly-Si coatings, the highest possible heat resistance of the substrate is also desired for substrates for TFT display technology. Since the thermal expansion of the Si layers decreases with increasing crystallinity thereof, glasses having very low expansion $\alpha_{20/300}$ of up to $3.0 \cdot 10^{-6}$/K or less are also desired here.

The current development of $\mu$c-Si technology is moving in the direction of a substrate concept, i.e. the support material forms the basis of the solar cells and the incident light does not pass through it. In addition, a development towards a less expensive superstrate arrangement (light passes through the substrate material, no cover glass necessary) is not excluded. In order to achieve high efficiencies, high transparency of the glass in the VIS/UV is then necessary, which means that the use of semi-transparent glass-ceramics, besides the abovementioned cost reasons, proves to be disadvantageous.

For the last-mentioned application (superstrate) and for said applications as display substrates, the quality of the glasses with respect to the number and size of flaws, such as solid inclusions and bubbles, is of great importance since they impair the transparency of the glasses.

The glasses should thus if possible be free from or at least have a low content of bubbles and streaks. In particular of the glasses processed by the float method, a well fined glass can only be obtained with difficulty since the known effective fining agents As$_2$O$_3$ and Sb$_2$O$_3$ cannot be employed owing to their ease of reduction under the conditions of the float bath.

Similar demands are also made of glasses for light bulbs: glasses for halogen lamps must be essentially free from alkali metals since alkali metal ions disrupt the regenerative halogen cycle of the lamp. The glasses must have high thermal stability since high bulb temperatures usually occur in operation. The glasses must be sufficiently stable to devitrification in order to be suitable for tube drawing. For use as lamp envelope glass for light bulbs which contain molybdenum components as electrode or lead material, the thermal expansion of the glasses must be matched to that of molybdenum ($\alpha_{20/300} = 5.0 \cdot 10^{-6}$/K) in order that leak-tight, stress-free fusing is achieved between the metal and the glass. Also for this use, the glasses should have the lowest possible bubble content.

The complex property profile outlined above is achieved best by borosilicate glasses from the alkaline earth metal aluminoborosilicate glass sub-family. Commercially available glasses for TFT and AMLCD applications also belong to this glass type. Numerous patent specifications which describe glasses for said uses are also already known:

EP 672 629 A2 and U.S. Pat. No. 5,508,237 describe aluminosilicate glasses for flat-panel displays. They exhibit various composition ranges with various coefficients of thermal expansion. These glasses can allegedly be processed not only by the overflow fusion drawing process, but also by other flat-glass production methods. However, the glasses, in particular, which have a coefficient of thermal expansion matched to polycrystalline Si will have very high working points $V_A$, which make them unsuitable for the float process. The visual quality of the glasses will not be high since no method for effective, in particular float-compatible fining is indicated. The fining agents $Sb_2O_3$ and $As_2O_3$ mentioned by way of example are unsuitable for the float process owing to their ease of reduction. The same applies to the optional glass components $Ta_2O_5$ and $Nb_2O_5$. The same applies to the alkali-free glasses for TFT display applications which are described in the specifications U.S. Pat. No. 5,374,595, WO 98/270 19, EP 714 862 A1, EP 341 313 B1 and JP 10-722 37 A. The glasses of JP 8-295530 A, JP-9-48632 A and JP 9-156 953 A likewise cannot be fined effectively.

A similar, albeit lesser deficit is also exhibited by the glasses having broad composition ranges from the specifications WO 97/11919 and WO 97/11920, even though $SnO_2$ is mentioned here at least as an optional fining agent.

JP 10-139467 A describes alkali-free glasses having high acid resistances for display applications in which $SnO_2$, $TiO_2$ and $ZrO_2$ are in each case optional components, their sum being at least 0.1 mol %. No further fining details are given.

The good fining action of $SnO_2$ in alkali-free alkaline earth metal aluminoborosilicate glass melts is documented in the patent specifications DE 196 17 344 C1 and DE 196 03 698 C1. The tin-containing glasses therein not only have good basic glass properties for their use as TFT display glass, but can also be produced with high product quality. The unexamined Japanese publication JP 10-59741 A also describes $SnO_2$-fined alkali-free glasses, again from a broad composition range.

In the case of the zinc-free aluminoborosilicate glasses described in the patent specification DE 197 39 912 C1, it has been found that the combination of $SnO_2$ and $CeO_2$ significantly exceeds the fining action of $SnO_2$ through stabilization of the $SnO_2/SnO$ redox equilibrium. The very crystallization-stable glasses described therein can be produced and processed on a large industrial scale both by the float process and by a wide variety of drawing processes, such as microsheet down-draw or overflow fusion processes.

By contrast, JP 10-130034 A and JP 10-114538 A indicate the particular fining action of the $As_2O_3+SnO_2$ and $Sb_2O_3+SnO_2$ combination. In contrast to combined $SnO_2/CeO_2$ fining, however, there is a considerable potential risk regarding corrosion of platinum material parts in the interface and hot-shaping area. DE 196 01 922 A1 describes SnO- and $ZrO_2$-containing alkali-free alkaline earth metal aluminoborosilicate glasses which have very good crystallization stabilities, although both SnO and $ZrO_2$ are said to increase the tendency towards crystallization if they are added individually.

An object of the present invention is to provide glasses which have high internal glass quality, are stable at high temperatures, have good melting and processing properties, have good chemical resistance and have coefficients of thermal expansion $\alpha_{20/300}$ of from 2.8 to $5.0 \cdot 10^{-6}/K$.

This object is achieved by the glasses described herein. Uses of the glasses are also described.

The glasses comprise 50–70% by weight of the network former $SiO_2$. At low contents, the chemical resistance and the heat resistance of the glasses are impaired. Higher contents of $SiO_2$ increase the viscosity of the melt at high temperatures and thus impair the melting properties of the glasses. Its devitrification tendency also increases, it being possible for, in particular, crystalline precipitations of $SiO_2$ to occur as cristobalite. The content is preferably 53–68% by weight, particularly preferably >55% to 65% by weight, very particularly preferably >58% by weight of $SiO_2$.

The $Al_2O_3$ content can be from 10 to 25% by weight. Higher contents have an adverse effect on the process temperatures during hot shaping, since the working point $V_A$ would be greatly increased. Lower contents increase the crystallization susceptibility of the glasses and lower the glass transition temperatures $T_g$ and thus the thermal stability of the glasses. The content is preferably from 12 to 24% by weight, particularly preferably from >14% to 23% by weight.

$B_2O_3$, likewise a network former, is present in the glasses in an amount of 0.5–15% by weight. Higher contents would reduce the chemical resistance to acids and the thermal stability of the glasses. At lower contents, the melting-simplifying action of the $B_2O_3$ or of the boric acid would not yet be very pronounced, and the crystallization stability would be reduced. The contents are preferably from 3, especially from 4, to 13% by weight, particularly preferably from 5 to 11% by weight.

The total alkaline earth metal oxide content and its specific implementation by means of one or preferably more oxides can vary within a relatively broad range, giving thermal expansions of from $\alpha_{20/300}=2.8 \cdot 10^{-6}/K$ to $\alpha_{20/300}=5.0 \cdot 10^{-6}/K$: thus, the glasses can contain 0–10% by weight of MgO, 0–12% by weight of CaO, 0–12% by weight of SrO and 0–15% by weight of BaO, where the sum of these oxides is at least 8% by weight and at most 26% by weight, preferably from 8 to 24% by weight, particularly preferably from 8 to 21% by weight. An alkaline earth metal oxide content of at least 9% by weight is very particularly preferred. In particular for glasses having rather low expansion coefficients ($\alpha_{20/300} \leq 4.0 \cdot 10^{-6}/K$), it is preferred to restrict the sum of the alkaline earth metal oxides to a maximum of 18% by weight. With the aim of a low temperature at viscosity $10^4$ dPas, good melting properties and low density, the presence of the lightweight oxides MgO and/or CaO is preferred. Both oxides are preferably present. Their maximum content is preferably 9% by weight each. A minimum content of MgO of at least 0.5% by weight is preferred. A content of 0.5–8% by weight of CaO and 3.3–8% by weight of MgO is particularly preferred. Higher contents than the 10 and 12% by weight mentioned would lower the chemical resistance, in particular to buffered hydrofluoric acid solution, and the devitrification stability. A minimum content of >4% by weight of MgO is very particularly preferred.

Although it is advantageous in respect of simple batch production to employ as few different alkaline earth metal oxides as possible, even the presence of small amounts of further oxides increases the crystallization stability of the glasses. SrO and BaO in particular have an advantageous effect on the heat and crystallization stability. The presence of SrO is therefore also preferred. A maximum content of 9% by weight of SrO and 12% by weight of BaO is preferred. A content of 0.5–8% by weight of SrO and the additional presence of BaO in a maximum amount of 10% by weight is particularly preferred.

Particularly high-temperature-resistant glasses have low $B_2O_3$ contents, preferably <5% by weight, and relatively high $SiO_2$ contents. Glasses having high coefficients of expansion ($\alpha_{20/300} \geq 4 \cdot 10^{-6}/K$) have rather high contents of alkaline earth metal oxides, preferably up to 25% by weight. Thus, glasses which are particularly suitable as high-temperature-resistant glasses, for example as high-temperature-resistant lamp glasses, have low $B_2O_3$ contents, preferably even $\leq 3\%$ by weight, and comparatively high SrO and in particular high BaO contents. They thus have comparatively high density. Glasses having low coefficients of expansion ($\alpha_{20/300} \leq 4.0 \cdot 10^{-6}/K$) contain rather less alkaline earth metal oxides, preferably $\leq 18\%$ by weight, preferably composed of up to 7% by weight of MgO, up to 7% by weight of CaO, up to 7% by weight of SrO and up to 5% by weight of BaO. Particular preference is given in these classes to network former contents of 60±2% by weight of $SiO_2$, 17±2% of $Al_2O_3$ and 7.5±1.5% of $B_2O_3$.

The glasses according to the invention may furthermore contain up to 10% by weight of ZnO, preferably up to 5% by weight of ZnO. With its effect on the viscosity characteristic line; which is similar to that of boric acid, ZnO has a network-loosening action. In particular on processing of the glasses by the float process, the ZnO content is preferably restricted to rather low amounts ($\leq$2% by weight) or ZnO is omitted entirely.

The glasses can contain up to 5% by weight, preferably up to 3% by weight, particularly preferably up to 2% by weight, of $ZrO_2$. $ZrO_2$ increases the heat resistance of the glasses. However, a disadvantage is its sparing solubility, which can result in $ZrO_2$-containing melt relics, so-called zirconium nests. $ZrO_2$ is therefore preferably omitted, impurities of up to about 0.5% by weight, for example as a consequence of corrosion of the refractory material of the troughs, not being interfering.

The glasses can contain up to 5% by weight, preferably up to 3% by weight, of $TiO_2$. $TiO_2$ reduces the solarization tendency of the glasses. At contents >5% by weight of $TiO_2$, colour casts can occur due to complex formation with $Fe^{3+}$ ions originating from impurities of the raw materials usually employed. $TiO_2$ is therefore preferably omitted.

A constituent of the glasses which is essential to the invention is $MoO_3$. Even small amounts of this component produce high internal glass quality in these high-melting aluminoborosilicate glasses, i.e. high quality with respect to freedom from or a low content of bubbles and streaks. The glasses therefore contain 0.05–2% by weight, preferably 0.1–1.5% by weight, of $MoO_3$. The effectiveness of this constituent compared with other components, such as $SnO_2$ and/or $As_2O_3$, is illustrated in the working examples. It was hitherto known that $MoO_3$ acts as decolorizing agent in extremely small amounts in domestic glasses (see Bulycheva et al.: Glass and Ceramics, Vol. 55, Nos. 1–2, 1998, pp. 42 ff).

Owing to the high effectiveness of $MoO_3$, the addition of further fining agents is unnecessary. Such glasses are free from $As_2O_3$, $Sb_2O_3$ and $SnO_2$, apart from usual impurities. Impurities of the last-mentioned component can enter the glass, for example during production of the glasses in electrically heated troughs through corrosion of the electrode material. The exclusion of the two first-mentioned components enables processing of the glasses by the float process.

In a different type of processing of the glasses, for example in the drawing processes, the glasses may also contain $As_2O_3$ and/or $Sb_2O_3$ in order further to improve the already high internal glass quality. Irrespective of the processing method, the addition of halides, sulphates and/or $CeO_2$ is also possible.

Furthermore, the glasses may contain $P_2O_5$, $Ga_2O_3$, $Gd_2O_3$, $Fe_2O_3$, $La_2O_3$, $Nb_2O_5$ and/or $Ta_2O_5$. Thus, for example, $P_2O_5$ and $Ga_2O_3$ are favourable with respect to the crystallization stability of the glasses. The other oxides can have an advantageous effect on the refractive index and the chemical resistance.

The glasses can also contain PbO and/or CdO. On processing by the float method, however, these readily reducible constituents should also be omitted.

The sum of the components $CeO_2$, $As_2O_3$, $Sb_2O_3$, PbO, CdO, $P_2O_5$, $Ga_2O_3$, $Gd_2O_3$, $Fe_2O_3$, $La_2O_3$, $Nb_2O_3$, $Ta_2O_5$, halides and sulphates should not exceed 5% by weight in order to avoid adversely affecting the remainder of the property profile of the glasses.

The high internal glass quality of $MoO_3$-containing glasses can be improved further merely through addition of small amounts of $SnO_2$. The glasses may therefore contain up to 2% by weight of $SnO_2$. The glasses preferably. contain at least 0.1% by weight of $SnO_2$ and at most 0.5% by weight of $SnO_2$. At higher contents, crystallization in the glass or corrosion of Pt employed in the hot-shaping area can occur on contact with Pt.

The glasses are alkali-free. The term "alkali-free" here is taken to mean that they are essentially alkali-free, i.e. they can contain impurities of less than 1000 ppm.

The action of the $MoO_3$ in the glasses according to the invention goes well beyond that of a fining agent: it improves the acid resistance (cf. Examples A2 and V4) and the solarization stability. It also improves the devitrification stability. With a reduced upper devitrification limit (UDL), an increased difference T4-UDL (cf. Examples A7 and V5) arises, which means an increased processing range. In addition, it increases the corrosion resistance of Mo in contact with the glass or with the melt.

WORKING EXAMPLES

Eight glasses according to the invention (A1–A8) and 5 comparative glasses (V1–V5) were produced in Pt/Ir crucibles at 1620° C. from conventional raw materials which were essentially alkali-free apart from unavoidable impurities. The melts were fined at this temperature for one and a half hours, then transferred into inductively heated platinum crucibles and stirred at 1550° C. for 30 minutes for homogenization. Before pouring into preheated moulds, the glass melts were homogenized at 1580° C. for about 30 minutes in a high-temperature furnace.

The table shows the compositions of the glasses (in % by weight, based on oxide) and their major properties. The following are given:

the density $\rho [g/cm^3]$ the coefficient of thermal expansion $\alpha_{20/300}[10^{-6}/K]$ the dilatometric glass transition temperature $T_g$ [° C.] in accordance with DIN 52324 the temperature at a viscosity of $10^4$ dPas (referred to as T4 [° C.])

the temperature at a viscosity of $10^2$ dPas (referred to as T2 [° C.]), calculated from the Vogel-Fulcher-Tammann coefficient resistance to hydrochloric acid as weight loss (material removal value) from glass plates measuring 50 mm×50 mm×2 mm polished on all sides after treatment with 5% strength hydrochloric acid for 24 hours at 95° C. [$mg/cm^2$] (referred to as HCl [$mg/cm^2$])

resistance to buffered hydrofluoric acid as weight loss (material removal value) from glass plates measuring 50 mm×50 mm×2 mm polished on all sides after treatment with 10% strength $NH_4F$. HF solution for 20 minutes at 23° C. [$mg/cm^2$] (referred to as BHF [$mg/cm^2$])

the refractive index $n_d$ the upper devitrification limit UDL [° C.], i.e. the liquidus temperature the maximum crystal growth rate $V_{max}$ [$\mu m/h$]

the bubble quality; macroscopic qualitative finding
  0 extremely large number of bubbles
  –large number of bubbles
  +well fined
  ++virtually bubble-free
  +++bubble-free

TABLE

Compositions (in % by weight, based on oxide) and essential properties of glasses according to the invention (A) and comparative glasses (V)

| | A1 | A2 | A3 | A4 | A5 | A6 | A7 | A8 | V1 | V2 | V3 | V4 | V5 |
|---|---|---|---|---|---|---|---|---|---|---|---|---|---|
| $SiO_2$ | 60.6 | 60.4 | 61.6 | 61.3 | 55.1 | 59.1 | 57.3 | 61.0 | 60.2 | 60.1 | 60.0 | 60.3 | 57.4 |
| $B_2O_3$ | 7.8 | 7.8 | 8.2 | 8.2 | 9.9 | 5.7 | 8.0 | 3.0 | 8.3 | 8.2 | 8.1 | 7.8 | 8.0 |
| $Al_2O_3$ | 17.0 | 17.0 | 16.0 | 16.0 | 18.8 | 20.5 | 17.1 | 12.0 | 15.3 | 15.2 | 15.3 | 17.0 | 17.0 |
| MgO | 5.2 | 5.2 | 3.5 | 3.5 | 5.1 | 2.2 | 5.0 | 0.5 | 6.3 | 6.2 | 6.1 | 5.5 | 5.0 |
| CaO | 3.7 | 3.7 | 6.9 | 6.9 | 7.1 | 1.2 | 2.0 | 6.2 | 3.9 | 3.8 | 3.9 | 3.7 | 2.0 |
| SrO | 5.0 | 5.0 | 0.5 | 0.5 | — | 4.0 | 6.0 | 8.8 | 5.3 | 5.2 | 5.1 | 5.0 | 6.0 |
| BaO | 0.5 | 0.5 | 3.1 | 3.1 | 1.5 | 5.0 | 3.3 | 8.0 | 0.7 | 0.5 | 0.5 | 0.5 | 3.3 |
| ZnO | — | — | — | — | 2.0 | 1.0 | — | — | — | — | — | — | — |
| $TiO_2$ | — | — | — | — | — | 0.5 | — | — | — | — | — | — | 0.5 |
| $ZrO_2$ | | | | | | | | | | | | | 0.4 |
| $CeO_2$ | | | | | | — | — | — | — | — | — | — | 0.2 |
| $MoO_3$ | 0.2 | 0.2 | 0.2 | 0.2 | 0.5 | 0.8 | 1.0 | 0.5 | — | — | — | — | — |
| $SnO_2$ | — | 0.2 | — | 0.3 | — | — | 0.3 | — | — | — | 0.2 | 0.2 | 0.2 |
| $As_2O_3$ | — | — | — | — | — | — | — | — | — | 0.8 | 0.8 | — | — |
| ρ [g/cm³] | 2.507 | 2.499 | 2.479 | 2.484 | 2.512 | 2.550 | 2.564 | 2.714 | n.m. | n.m. | n.m. | 2.506 | 2.563 |
| $\alpha_{20/300}$ [$10^{-6}$/K] | 3.59 | 3.58 | 3.68 | 3.63 | 3.75 | 3.09 | 3.70 | 4.79 | n.m. | n.m. | n.m. | 3.55 | 3.69 |
| $T_g$ [°C.] | 720 | 714 | 702 | 711 | 710 | 742 | 716 | 715 | n.m. | n.m. | n.m. | 716 | 716 |
| T4 [°C.] | 1253 | 1262 | 1268 | 1271 | 1192 | 1322 | 1248 | 1274 | n.m. | n.m. | n.m. | 1264 | 1252 |
| T2 [°C.] | 1626 | 1639 | 1657 | 1662 | 1514 | 1702 | 1618 | 1699 | n.m. | n.m. | n.m. | 1642 | 1595 |
| HCl [mg/cm²] | n.m. | 0.48 | n.m. | 0.30 | n.m. | n.m. | n.m. | n.m. | n.m. | n.m. | n.m. | 0.61 | n.m. |
| BHF [mg/cm²] | n.m. | 0.72 | n.m. | 0.51 | n.m. | n.m. | 0.70 | n.m. | n.m. | n.m. | n.m. | n.m. | n.m. |
| $n_d$ | 1.520 | 1.522 | 1.519 | 1.522 | 1.525 | 1.524 | 1.526 | n.m. | n.m. | n.m. | n.m. | n.m. | n.m. |
| UDL [°C.] | n.m. | 1235 | n.m. | free | n.m. | n.m. | 1150 | n.m. | n.m. | n.m. | n.m. | n.m. | 1200 |
| $v_{max}$ [μm/h] | n.m. | 13 | n.m. | free | n.m. | n.m. | 31 | n.m. | n.m. | n.m. | n.m. | n.m. | 62 |
| Bubble quality | + | ++ | + | ++ | + | ++ | +++ | + | 0 | ++ | +++ | + | ++ | n.m. = not measured
free = no devitrification

The glasses according to the invention have the following advantageous properties:

They have high internal glass quality.

They have high glass transition temperatures of $T_g > 650°$ C. This is desired for the lowest possible compaction as a result of production and for use of the glasses as substrates for annealing processes of amorphous Si layers.

They have temperatures of at most 1330° C., usually even <1330° C., at a viscosity of $10^4$ dPas, which indicates a processing range which is more favourable for the process. In addition, they have positive and relatively large differences between T4 and UDL.

They have good devitrification stability. They have good chemical resistance, documented by the good acid resistance, which makes them adequately inert to the chemicals used in the production of flat-panel screens. They have relatively low densities.

The glasses have high solarization stability and high thermal shock resistance. They have low refractive indexes as a basic physical prerequisite for high transparency.

The glasses can be processed by a wide variety of methods; for example by a wide variety of drawing methods for flat glasses, for example (microsheet) down-draw and up-draw processes, but also in tube drawing processes, and, if $As_2O_3$, $Sb_2O_3$, PbO and CdO are omitted, also by the float method.

The glasses have coefficients of thermal expansion $\alpha_{20/300}$ of from $2.8 \cdot 10^{-6}$/K to $5.0 \cdot 10^{-6}$/K.

Glasses having coefficients of thermal expansion of $\leq 4.0 \cdot 10^{-6}$/K are matched to the expansion behaviour of Si (a-, poly- and μc-Si). With this property profile, they are highly suitable for use as substrate glass in thin-film photovoltaics, in particular based on μc-Si, and in display technology, in particular for TFT displays. Owing to their relatively low alkaline earth metal content, they have low densities (ρ ≤ 2.600 g/cm³), which is particularly advantageous for display applications in order to keep the total weight of the display low in the case of large picture formats.

Glasses having transition temperatures Tg of ≥715° C. and coefficients of thermal expansion $\alpha_{20/300}$ of from $4.0 \cdot 10^{-6}$/K to $5.0 \cdot 10^{-6}$/K are, since their thermal expansion is matched to that of W and Mo and they have very high thermal stability, highly suitable for use as sealing glasses for W and Mo and as envelope glass for light bulbs, in particular glasses having $\alpha_{20/300}$ of from $4.5 \cdot 10^{-6}$/K to $5.0 \cdot 10^{-6}$/K for light bulbs having Mo components, in particular for those having bulb temperatures of about 550–640° C.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 19939789.9 are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An alkali-free aluminoborosilicate glass of high quality with respect to freedom from bubbles, which has the following composition, in % by weight, based on oxide:

| | |
|---|---|
| $SiO_2$ | 50–70 |
| $B_2O_3$ | 0.5–15 |
| $Al_2O_3$ | 10–25 |
| MgO | 0–10 |
| CaO | 0–12 |
| SrO | 0–12 |
| BaO | 0–15 |
| with MgO + CaO + SrO + BaO | 8–26 |
| ZnO | 0–10 |
| $ZrO_2$ | 0–5 |
| $TiO_2$ | 0–5 |
| $SnO_2$ | 0–2 |
| $MoO_3$ | 0.05–2. |

2. A aluminoborosilicate glass according to claim 1, having the following composition, in % by weight, based on oxide:

| | |
|---|---|
| $SiO_2$ | 53–68 |
| $B_2O_3$ | 3–13 |
| $Al_2O_3$ | 12–24 |
| MgO | 0.5–9 |
| CaO | ≦9 |
| SrO | ≦9 |
| BaO | 0–12 |
| with MgO + CaO + SrO + BaO | 8–24 |
| ZnO | 0–5 |
| $ZrO_2$ | 0–3 |
| $TiO_2$ | 0–3 |
| $SnO_2$ | 0–2 |
| $MoO_3$ | 0.1–1.5. |

3. An aluminoborosilicate glass according to claim 2, wherein the glass comprises at least >4% by weight of MgO.

4. An aluminoborosilicate glass according to claim 2, wherein the glass additionally comprises up to a total of 5% by weight of one or more constituents selected from the group consisting of $CeO_2$, $As_2O_3$, $Sb_2O_3$, $P_2O_5$, PbO, CdO, $Ga_2O_3$, $Gd_2O_3$, $Fe_2O_3$, $La_2O_3$, $Nb_2O_5$, $Ta_2O5$, halides and sulphates.

5. An aluminoborosilicate glass according to claim 2, wherein the glass comprises at least 0.1% by weight of $SnO_2$.

6. An aluminoborosilicate glass according to claim 2, having a coefficient of expansion, $\alpha_{20/300}$, of from $2.8 \cdot 10^{-6}$/K to $5.0 \cdot 10^{-6}$/K, a glass transition temperature, Tg, of >650° C. and a temperature at viscosity $10^4$ dPas of ≦1330° C.

7. A substrate glass for a display constructed of an aluminoborosilicate glass according to claim 2, having a coefficient of thermal expansion, $\alpha_{20/300}$, of ≦$4.0 \cdot 10^{-6}$/K.

8. A substrate glass for a thin-film photovoltaic constructed of an aluminoborosilicate glass according to claim 2, having a coefficient of thermal expansion, $\alpha_{20/300}$, of ≦$4.0 \cdot 10^{-6}$/K.

9. An envelope glass for a light bulb constructed of an aluminoborosilicate glass according to claim 2, having a coefficient of thermal expansion, $\alpha_{20/300}$, of from $4.0 \cdot 10^{-6}$/K to $5.0 \cdot 10^{-6}$/K and a glass transition temperature, Tg, of ≧715° C.

10. An aluminoborosilicate glass according to claim 1 having the following composition, in % by weight, based on oxide:

| | |
|---|---|
| $SiO_2$ | >55–65 |
| $B_2O_3$ | 5–11 |
| $Al_2O_3$ | >14–23 |
| MgO | 3.3–8 |
| CaO | 0.5–8 |
| SrO | 0.5–8 |
| BaO | ≦10 |
| with MgO + CaO + SrO + BaO | 8–21 |
| ZnO | 0–5 |
| $ZrO_2$ | 0–2 |
| $TiO_2$ | 0–3 |
| $SnO_2$ | 0–2 |
| $MoO_3$ | 0.1–1.5. |

11. An aluminoborosilicate glass according to claim 1, wherein the glass comprises at least >4% by weight of MgO.

12. An aluminoborosilicate glass according to claim 1, wherein the glass additionally comprises up to a total of 5% by weight of one or more constituents selected from the group consisting of $CeO_2$, $As_2O_3$, $Sb_2O_3$, $P_2O_5$, PbO, CdO, $Ga_2O_3$, $Gd_2O_3$, $Fe_2O_3$, $La_2O_3$, $Nb_2O_5$, $Ta_2O_5$, halides and sulphates.

13. An aluminoborosilicate glass according to claim 1, wherein the glass comprises at least 0.1% by weight of $SnO_2$.

14. An aluminoborosilicate glass according to claim 1, having a coefficient of expansions, $\alpha_{20/300}$, of from $2.8 \cdot 10^{-6}$/K to $5.0 \cdot 10^{-6}$/K, a glass transition temperature, Tg, of >650° C. and a temperature at viscosity $10^4$ dPas of ≦1330° C.

15. A substrate glass for a display constructed of an aluminoborosilicate glass according to claim 1, having a coefficient of thermal expansion, $\alpha_{20/300}$, of ≦$4.0 \cdot 10^{-6}$/K.

16. A substrate glass for a thin-film photovoltaic constructed of an aluminoborosilicate glass according to claim 1, having a coefficient of thermal expansion, $\alpha_{20/300}$, of ≦$4.0 \cdot 10^{-6}$/K.

17. An envelope glass for a light bulb constructed of an aluminoborosilicate glass according to claim 1, having a coefficient of thermal expansion, $\alpha_{20/300}$, of from $4.0 \cdot 10^{-6}$/K to $5.0 \cdot 10^{-6}$/K and a glass transition temperature, Tg, of ≧715° C.

* * * * *